United States Patent [19]

Tiegs et al.

[11] Patent Number: 4,803,783
[45] Date of Patent: Feb. 14, 1989

[54] APPARATUS FOR GAUGING THE DIAMETER AND CONCENTRICITY OF A BORE

[75] Inventors: Mark D. Tiegs, Winona, Minn.; Edward C. Gamoke, Arcadia, Wis.

[73] Assignee: Hein-Werner Corporation, Waukesha, Wis.

[21] Appl. No.: 62,460

[22] Filed: Jun. 12, 1987

[51] Int. Cl.$^4$ ................................................. G01B 5/08
[52] U.S. Cl. ..................................... 33/178 R; 33/543; 33/550; 33/147 K
[58] Field of Search ............. 33/147 E, 147 K, 178 R, 33/178 E, 517, 543, 550, 605

[56] References Cited

U.S. PATENT DOCUMENTS

| | | | |
|---|---|---|---|
| 1,308,324 | 7/1919 | Bellard | 33/178 R |
| 1,992,606 | 2/1935 | Darlington | 33/178 R |
| 2,197,198 | 4/1940 | Street | 33/178 |
| 2,565,844 | 8/1951 | Eisele | 33/178 |
| 2,599,835 | 6/1952 | Johnson et al. | 33/172 |
| 2,859,529 | 11/1958 | Aller et al. | 33/517 |
| 2,949,675 | 8/1960 | McElhose | 33/178 |
| 3,638,324 | 2/1972 | Kaifesh | 33/174 |
| 3,751,812 | 8/1973 | Meyer | 33/550 |
| 3,762,057 | 10/1973 | Kaifesh | 33/147 |
| 3,821,855 | 7/1974 | Baker et al. | 33/174 |
| 4,128,943 | 12/1978 | Muhlethaler | 33/174 |
| 4,266,329 | 5/1981 | Feller et al. | 29/222 |
| 4,280,278 | 7/1981 | Forsman | 33/147 E |
| 4,326,336 | 4/1982 | Hreha | 33/174 |
| 4,538,357 | 9/1985 | Dressel et al. | 33/203 |

Primary Examiner—Harry N. Haroian
Attorney, Agent, or Firm—Michael, Best & Friedrich

[57] ABSTRACT

An apparatus for gauging the diameter and concentricity of a bore in a workpiece, the bore having an inner surface, the apparatus comprising a base, a first surface engaging member supported by the base for movement along an axis and relative to a reference point, a selectively adjustable second surface engaging member supported by the base for movement along the axis, the second surface engaging member and the reference point defining the diameter of a circle, a third surface engaging member movably supported by the base and located on the circle, the third surface engaging member moving in response to movement of the second surface engaging member to maintain location of the third surface engaging member on the circle, the first, second, and third surface engaging members being adapted to be housed in the bore and to engage the inner surface of the bore, and the first surface engaging member being biased away from the second surface engaging member and against the inner surface of the bore, and a gauge for indicating movement of the first surface engaging member from the reference point.

41 Claims, 3 Drawing Sheets

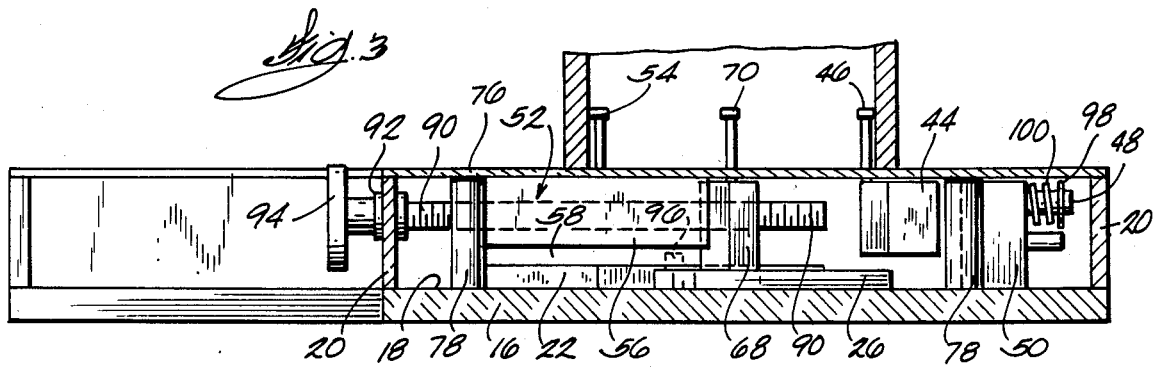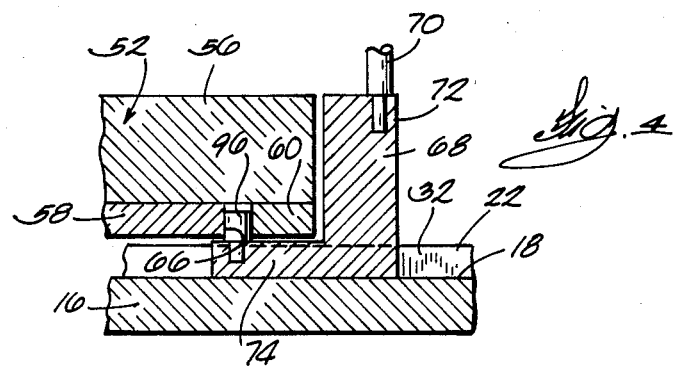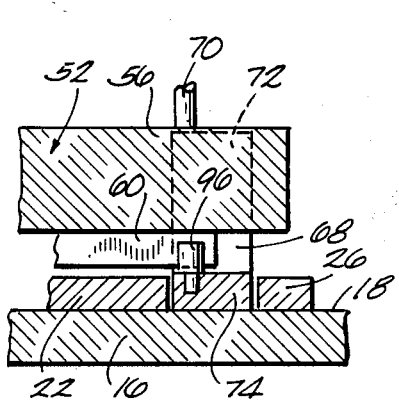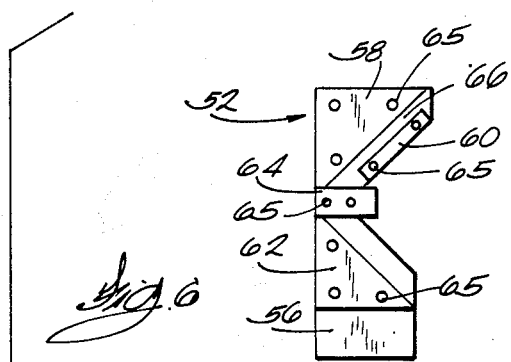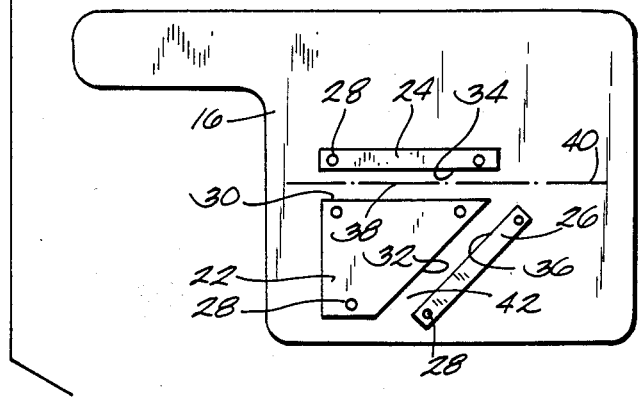

APPARATUS FOR GAUGING THE DIAMETER AND CONCENTRICITY OF A BORE

BACKGROUND OF THE INVENTION

The invention relates to apparatus for gauging the diameter of a bore, and to apparatus for gauging the concentricity of a bore.

Apparatus for use in gauging the diameter and concentricity of a bore are used in various machining applications, including, for example, the machining and honing of a crankshaft bore in the end of a piston rod. The prior art apparatus have complicated constructions, are expensive to manufacture, and are also difficult for the operators to use.

Attention is directed to the following U.S. Patents:

| Street | 2,197,198 | Apr. 16, 1940 |
| Johnson et al. | 2,599,835 | Jun. 10, 1952 |
| Eisele | 2,565,844 | Aug. 28, 1951 |
| McElhose | 2,949,675 | Aug. 23, 1960 |
| Kaifesh | 3,638,324 | Feb. 1, 1972 |
| Kaifesh | 3,762,057 | Oct. 2, 1973 |
| Baker et al. | 3,821,855 | Jul. 2, 1974 |
| Muhlethaler | 4,128,943 | Dec. 12, 1978 |
| Feller et al. | 4,266,329 | May 12, 1981 |
| Hreha | 4,326,336 | Apr. 27, 1982 |
| Dressel et al. | 4,538,357 | Sep. 3, 1985 |

SUMMARY OF THE INVENTION

The invention provides an apparatus for gauging the diameter and concentricity of a bore, which apparatus is relatively inexpensive to manufacture and is easy to use.

The apparatus has a planar upper surface and includes three pins extending upwardly from the surface and generally defining the vertices of a triangle. Two of the pins define the diameter of a circle, and the third pin is located on the circle at a point spaced from each of the other pins. The workpiece is placed over the pins so that the pins are housed in the bore and engage the inner surface of the bore. One of the pins on the diameter of the circle is movable, and the diameter of the bore is measured by measuring movement of this pin. The concentricity of the bore is gauged by rotating the workpiece about the pins and measuring movement of the movable pin.

More particularly, the apparatus comprises a base plate, and guide plates mounted on the base plate such that spaces between the guide plates define first and second slots disposed at a angle relative to each other, with the first slot also defining an axis. The apparatus also comprises a first support member supported by the base plate for movement along the axis and supporting a first pin. The apparatus further comprises a second support member slidably housed in the first slot for movement along the axis and supporting a second pin. The second pin and a reference point, relative to which the first pin is movable, define the diameter of a circle. The position of the second support member, and thus of the second pin, is selectively adjustable via an adjustment knob. This permits the diameter of the circle to be varied.

The apparatus also includes a third support member slidably housed in the second slot and supporting the third pin. In order to maintain the third pin on the circle, the second support member has therein a third slot which extends, in one embodiment of the invention, perpendicular to the second slot and at a 45° relative to the first slot, and the third support member is also slidable in the third slot. Accordingly, whenever the position of the second support member is changed, the position of the third support member changes so that the second and third pins and the reference point always define a 45-45-90 triangle.

The apparatus further includes a cover plate mounted on the base plate so that the guide plates and support members are positioned between the base plate and the cover plate. The cover plate has therein fourth and fifth slots respectively supperimposed over the first and second slots so that the first and second pins extend through the fourth slot and the third pin extends through the fifth slot. The cover plate provides the above-described upper surface of the apparatus.

The apparatus also includes means for biasing the first pin away from the second pin and against the inner surface of the bore, and a gauge for measuring movement of the first pin. The apparatus further includes a linear indicator having a digital readout for measuring the diameter of the circle defined by the second pin and the reference point.

The apparatus is used as follows. First, the position of the second pin is adjusted so that the indicator shows that the diameter of the circle defined by the first and second pins is equal to the desired diameter of the bore. Any movement of the second pin also results in a corresponding movement of the third pin such that the three pins define three points of a circle having a diameter indicated by the readout of the linear indicator. The workpiece having a bore is then placed over the pins so that the pins extend into the workpiece. The gauge indicates any deviation of the first pin from the reference position. If the first pin is in the reference position, the gauge shows zero deviation, and the diameter of the bore is as desired. Concentricity of the bore is measured by rotating the workpiece about the pins. If the gauge shows zero deviation throughout the rotation of the workpiece, the bore is concentric.

Other features and advantages of the invention will become apparent to those skilled in the art upon review of the following detailed description, claims, and drawings.

Description of the Drawings

FIG. 3 is a view taken along line 3—3 in FIG. 2.

FIG. 4 is a view taken along line 4—4 in FIG. 2.

FIG. 5 is a view taken along line 5—5 in FIG. 2.

FIG. 6 is an exploded top plan view of the base plate and guide plates and bottom plan view of the second support member.

Figure 1:
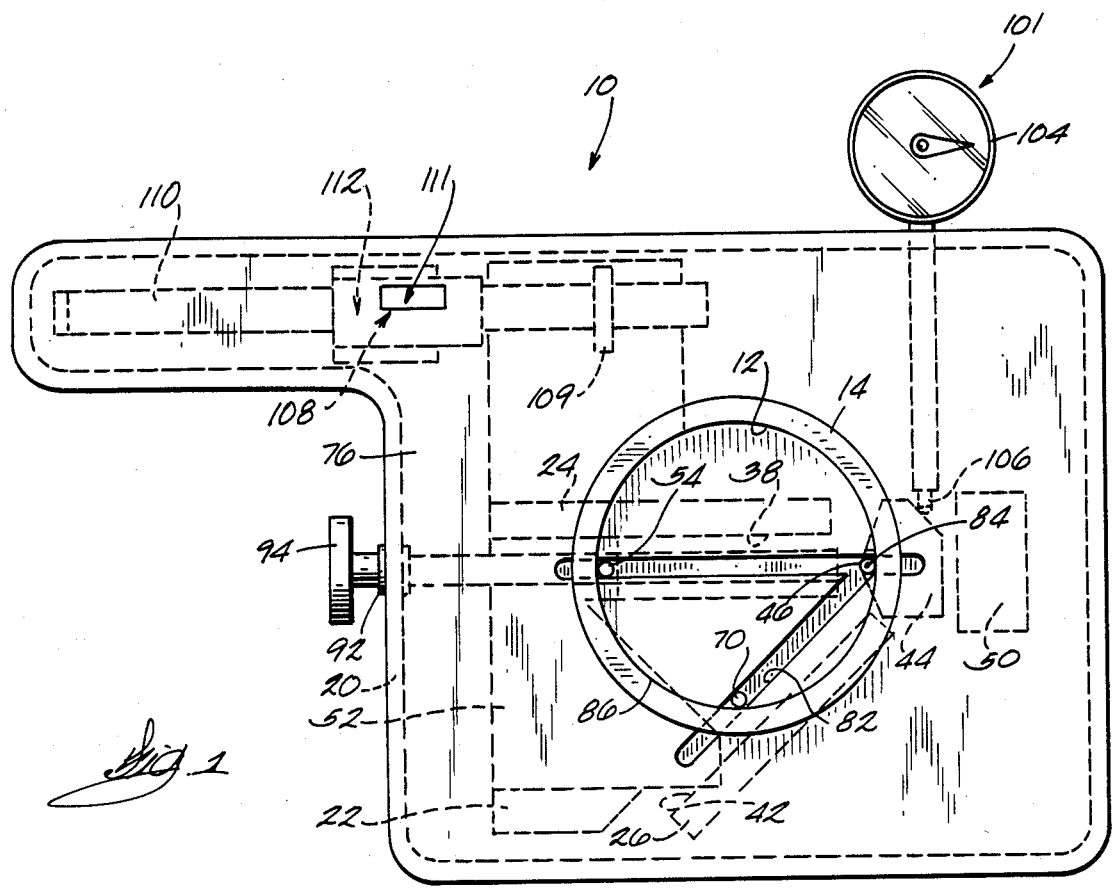
FIG. 1 is a top plan view of an apparatus embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 which is used for gauging the diameter and concentricity of a bore 12 in a workpiece 14, and which embodies various features of the invention, is illustrated in the drawings.

The apparatus 10 comprises (see FIGS. 2 and 3) a base plate 16 having a generally planar upper surface 18. A wall 20 extends upwardly from the upper surface 18 and around the periphery of the base plate 16.

The apparatus 10 also comprises (see FIGS. 2 and 6) first, second, and third guide plates 22, 24, and 26, respectively, mounted on the upper surface 18 of the base plate 16. While the guide plates can be mounted on the base plate 16 by any suitable means, in the preferred embodiment, the guide plates are mounted on the base plate 16 by bolts 28. The guide plates 22, 24, and 26 have substantially equal thicknesses. The first guide plate 22 has first and second linear edges 30 and 32, respectively, disposed at an acute angle relative to each other. Preferably, the first and second edges 30 and 32 are disposed at a 45° angle relative to each other. The second guide plate 24 is rectangular and has a linear edge 34, and the third guide plate 26 is rectangular and has a linear edge 36. As shown in FIG. 6, the guide plates 22, 24, and 26 are mounted on the upper surface 18 of the base plate 16 with the first edge 30 of the first guide plate 22 facing and spaced from the edge 34 of the second guide plate 24 to form a first slot 38 centered on an axis 40, and with the second edge 32 of the first guide plate 22 facing and spaced from the edge 36 of the third guide plate 26 to form a second slot 42 disposed at a 45° angle relative to the first slot 38.

Figure 2:
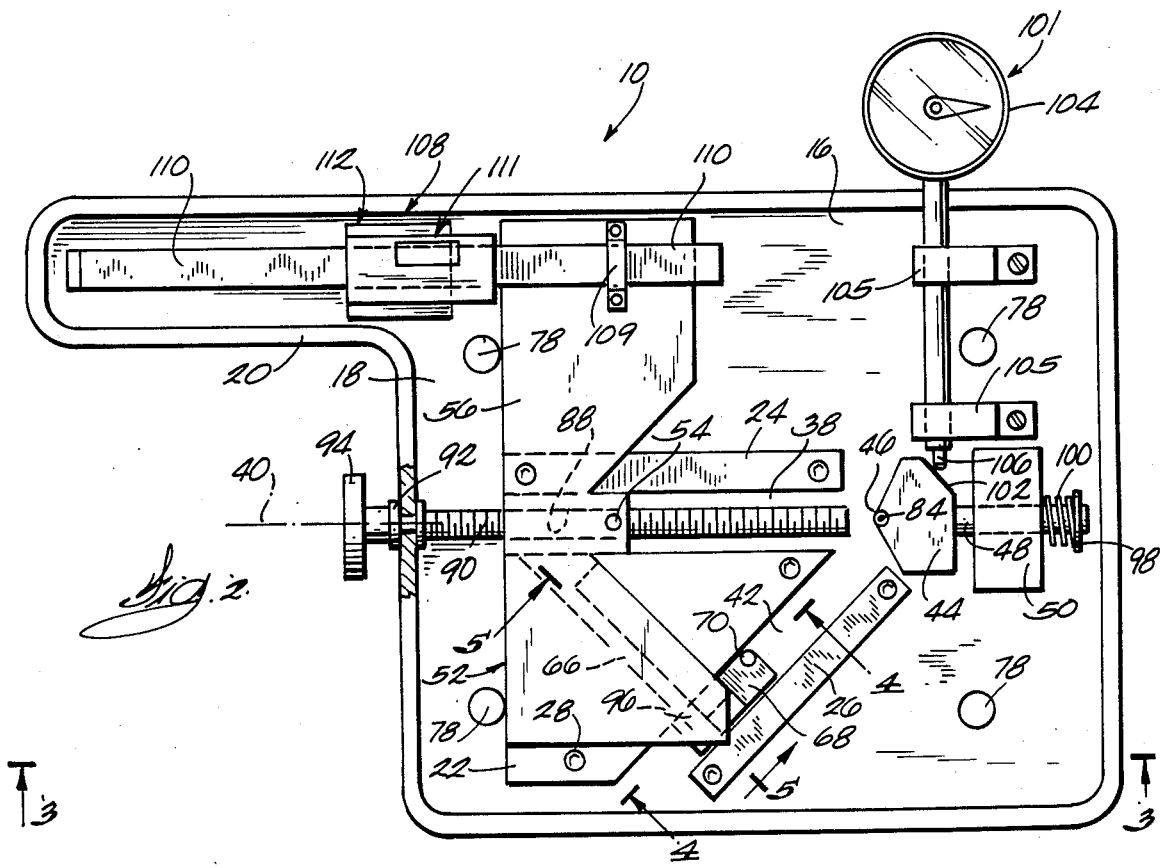
FIG. 2 is a top plan view of the apparatus with its cover plate removed.
Figure 7:
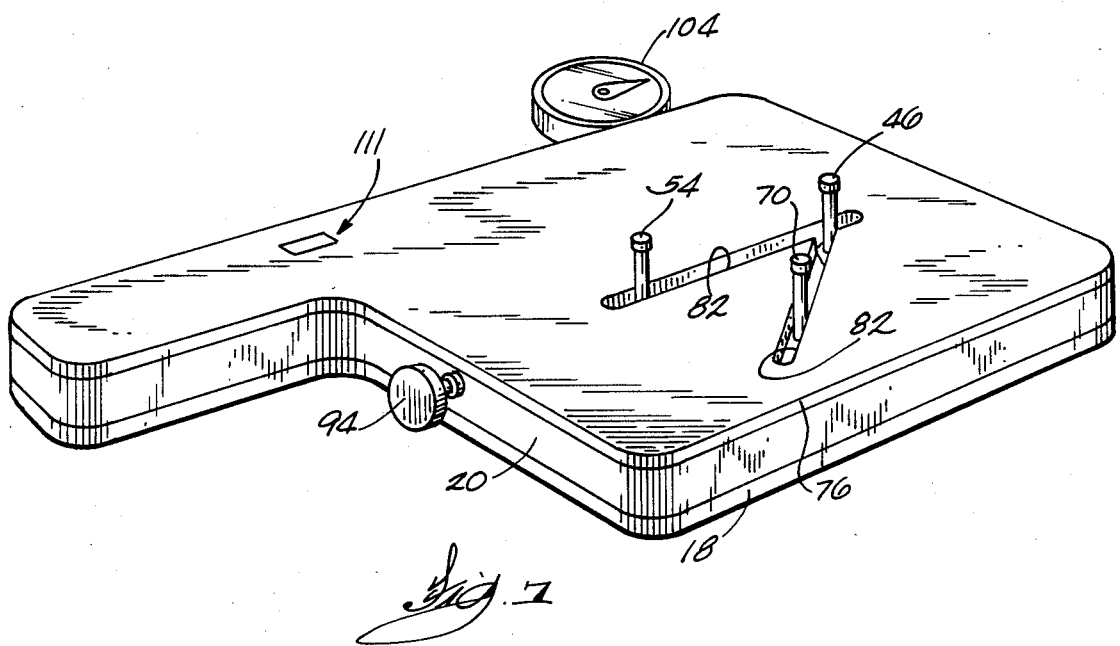
FIG. 7 is a perspective view of the apparatus.

The apparatus 10 further comprises a first support member 44 supported for movement along the axis 40 and having thereon a first surface engaging member or pin 46. In the preferred embodiment, as shown in FIGS. 2 and 3, the first support member 44 is mounted on the end of a shaft 48 extending along the axis 40, and the shaft 48 is slidably housed within a guide block 50 mounted on the upper surface 18 of the base plate 16.

The apparatus 10 further comprises (see FIGS. 2 and 6) a second support member 52 having a portion supported in the first slot 38 for movement along the axis 40 and having thereon a second surface engaging member or pin 54. The second support member 52 preferably includes a block 56 including upper and lower surfaces. The upper surface supports the second surface engaging member 54, and the lower surface has mounted thereon four blocks 58, 60, 62, and 64. The blocks 58, 60, 62, and 64 are connected to the block 56 by bolts 65 (FIG. 6). The blocks 58, 60, and 62 have substantially equal thicknesses, and the block 64 has a thickness greater than the thicknesses of the other three blocks. The block 64 has a width just slightly less than the width of the first slot 38, and the portion of the block 64 extending beneath the other three blocks 58, 60, and 62 is slidably housed in the first slot 38. The blocks 58 and 60 have generally parallel, spaced linear edges defining a third slot 66, the reason for which is explained hereinafter. The lower surfaces of the blocks 58, 60, and 62 slide along the upper surfaces of the guide plates 22, 24 and 26.

The apparatus 10 further comprises (see FIGS. 2-5) a third support member 68 slidably housed in the second slot 42 and having thereon a third surface engaging member or pin 70. The third support member 68 is generally L-shaped, as shown in FIG. 4, and has a generally vertical portion 72 and a generally horizontal portion 74. The third surface engaging member 70 is mounted on the upper end of the vertical portion 72. The horizontal portion 74 of the third support member 68 extends along and is slidably housed in the second slot 42.

The apparatus 10 also comprises (see FIGS. 1 and 3) a cover plate 76 mounted on the base plate 16 so that the guide plates 22, 24, and 26 and support members 44, 52, and 68 are positioned between the cover plate 76 and the base plate 16. In the preferred embodiment, the cover plate 76 is mounted on the wall 20 and on a plurality of spacers 78 (FIGS. 2 and 3) extending between the base plate 16 and the cover plate 76. As shown in FIGS. 1 and 3, the cover plate 76 has therethrough fourth and fifth slots 80 and 82 respectively superimposed over the first and second slots 38 and 42 so that the first and second surface engaging members or pins 46 and 54 extend through the fourth slot 80 and the third surface engaging member or pin 70 extends through the fifth slot 82. The fourth slot 80 has a width less than the width of the first slot 38 and the fifth slot 82 has a width less than the width of the second slot 42 so that the second support member 52 is slidably trapped between the cover plate 76 and the base plate 16 in the first slot 38 and the third support member 68 is slidably trapped between the cover plate 76 and the base plate 16 in the second slot 42.

The surface engaging members 46, 54, and 70 are adapted to be housed in the bore 12 in the workpiece 14 and to engage the inner surface of the bore 12. As shown in FIG. 1, the second surface engaging member or pin 54 and a reference point 84 define the diameter of a circle 86. When the first surface engaging member or pin 46 is located on the reference point 84, the first and second surface engaging members 46 and 54 define the diameter. As also shown in FIG. 1, the third surface engaging member or pin 70 is also located on the circle 86. The significance of this is explained hereinafter.

The apparatus 10 also comprises means for selectively adjusting the position of the second surface engaging member 54 relative to the reference point 84, i.e., relative to the base plate 16. While various suitable means can be employed, in the preferred embodiment, this means includes the second support member 52 and means for selectively adjusting the position of the second support member 52. Preferably, the means for adjusting the position of the second support member 52 includes (see FIG. 2) an internally threaded bore 88 in the second support member 52, an externally threaded shaft 90 threadedly received in the bore 88, and means for supporting the shaft 90 on the base plate 16 so that the shaft 90 is fixed against axial movement relative to the base plate 16 and is manually rotatable relative to the base plate 16. In the illustrated construction, the shaft 90 is supported by the wall 20 and is fixed against axial movement by retaining rings 90 located on either side of the wall 20. The outer end of the shaft 90 has thereon a knob 94 for facilitating manual rotation of the shaft 90. Because the shaft 90 is fixed against axial movement, rotation of the shaft 90 causes movement of the second support member 52 along the shaft 90.

The apparatus 10 further comprises means for moving the third surface engaging member 70 in response to movement of the second surface engaging member 54 to maintain location of the third surface engaging member 70 on the circle 86. While various suitable means can be employed, in the preferred embodiment, this means includes the third support member 68, and the third slot 66 in the second support member 52. More particularly, as shown in FIG. 4, the horizontal portion 74 of the third support member 68 has thereon an upwardly extending pin 96 slidably housed in the third slot 66 so that the third support member 68 is slidable in both the second and third slots 42 and 66, respectively. Furthermore, in the preferred embodiment, the third slot 66 is perpendicular to the second slot 42 and is disposed at a 45° angle relative to the first slot 38. Because the first, second, and third slots form a 45-45-90 triangle, with the hypotenuse of this triangle being the diameter of the circle 86, and because the third surface engaging member 70 is always maintained at the right-angle corner of this triangle, the third surface engaging member 70 is always maintained on the circle 86.

The apparatus 10 further comprises means for biasing the first surface engaging member 46 away from the second surface engaging member 54 and against the inner surface of the bore 12. While various suitable means can be used, in the illustrated construction, this means includes (see FIGS. 2 and 3) a clip 98 on the shaft 48, and a spring 100 extending between the guide block 50 and the clip 98 for biasing the shaft 48 to the right (as shown in FIG. 2).

The apparatus 10 further comprises (see FIGS. 1 and 2) means 101 for indicating movement of the first surface engaging member 46 from the reference point 84 so that, when the workpiece 14 is positioned with the surface engaging members 46, 54, and 70 engaging the inner surface of the bore 12, the indicating means 101 indicates deviation of the diameter of the bore 12 from the diameter defined by the second surface engaging member 54 and the reference point 84, and so that, when the workpiece 14 is rotated about the surface engaging members 46, 54, and 70, the indicating means 101 gauges the concentricity of the bore 12. While various suitable means can be employed, in the preferred embodiment, the first support member 44 has thereon a surface 102 (see FIG. 2) disposed at a 45° angle relative to the axis 40, and the indicating means 101 includes a conventional gauge 104 secured to the base plate 16 by clips 105 and having a plunger 106 biased against the surface 102. Movement of the first support member 44 along the axis 40 is translated into axial movement of the plunger 106. Thus, if the gauge 104 is zeroed when the first surface engaging member 46 is located at the reference point 84, the gauge 104 will indicate movement of the first surface engaging member 46 relative to the reference point 84.

The apparatus 10 further comprises (see FIGS. 1 and 2) means 108 for indicating the distance between the second surface engaging member 54 and the reference point 84 to thereby indicate the diameter of the circle 86 defined by the second surface engaging member 54 and the reference point 84. While various suitable means can be used, in the preferred embodiment, the means 108 includes a slide member 110 connected to the second support member 52 by a clip 109 and thus to the second surface engaging member 54, and means on the base plate 16 for sensing the position of the slide member 110 relative to the base plate 16. Preferably, the means for sensing the position of the slide member 110 includes means 111 for providing a visual display indicating the distance between the second surface engaging member 54 and the reference point 84 (i.e., for indicating the diameter of the circle 86). Preferably, the means 111 is a digital readout that is visible through an opening in the cover plate 76. In the preferred embodiment, the slide member 110 and means for sensing the position of the slide member 110 are a conventional linear indicator 112. Once the linear indicator 112 is calibrated to indicate the known distance between the second surface engaging member 54 and the reference point 84 when the second support member 52 is in a given position, the linear indicator 112 will properly indicate the distance between these points when the second support member 52 is in any other position. Thus, it is not necessary to have a sample workpiece in order to properly position the second surface engaging member 54. The second surface engaging member 54 is positioned simply by turning the knob 94 until the linear indicator 112 shows the desired diameter.

The apparatus 10 is used as follows. First, the knob 94 is turned to move the second surface engaging member 54 to the desired position. The second surface engaging member 54 is in the desired position when the linear indicator 112 shows the desired diameter. Next, the workpiece 14 is placed over the surface engaging members or pins 46, 54, and 70 so that the pins are housed in the bore 12 and engage the inner surface of the bore 12. Because the first surface engaging member 46 is biased away from the second surface engaging member 54, it pulls the workpiece 14 to the right (as shown in FIG. 1) and therefore maintains the inner surface of the bore 12 in engagement with the second and third surface engaging members 54 and 70. Because the third surface engaging member 70 is located on the circle 86 at a point spaced 90° from the second surface engaging member 54 and the reference point 84, it insures that the first and second surface engaging members 46 and 54 stay on the diameter of the bore 12. Any deviation of the diameter of the bore 12 from the desired diameter is shown by the gauge 104. If the diameter of the bore 12 is too small, the gauge 104 will show a negative distance. If the diameter of the bore 12 is too large, the gauge 104 will show a positive distance. In order to gauge the concentricity of the bore 12, the workpiece 14 is rotated about the surface engaging members. If the gauge 104 shows zero deviation throughout the rotation of the workpiece 14, the bore 12 is concentric. The amount of any deviation from concentricity will be indicated by the gauge 104.

Various features of the invention are set forth in the following claims.

We claim:

1. An apparatus for gauging the diameter and concentricity of a bore in a workpiece, the bore having an inner surface, said apparatus comprising a base, a first surface engaging member supported by said base for movement along an axis and relative to a reference point, a second surface engaging member supported by said base for movement along said axis, said second surface engaging member and said reference point defining the diameter of a circle, a third surface engaging member movably supported by said base and located on said circle, said first, second, and third surface engaging members being adapted to be housed in the bore and to engage the inner surface of the bore, means for selectively adjusting the position of said second surface engaging member relative to said reference point, means for moving said third surface engaging member in response to movement of said second surface engaging member to maintain location of said third surface engaging member on said circle, means for biasing said first surface engaging member away from said second surface engaging member and against the inner surface of the bore, means for indicating the diameter of said circle, said means for indicating the diameter of said circle including a member connected to said second surface engaging member, and means on said base for sensing the position of said member relative to said base, and means for indicating movement of said surface engaging member from said reference point so that, when the workpiece is positioned with said surface engaging members engaging the inner surface of the bore, said indicating means indicates deviation of the diameter of the bore from said diameter and, when the workpiece is rotated about said surface engaging members, said indicating means gauges the concentricity of the bore.

2. An apparatus as set forth in claim 1 wherein said means for sensing the position of said member includes means for providing a visual display indicating the diameter of said circle.

3. An apparatus as set forth in claim 1 wherein said base includes means defining first and second slots disposed at an acute angle relative to each other, wherein said second surface engaging member is slidable in said first slot, and wherein said third surface engaging member is slidable in said second slot.

4. An apparatus as set forth in claim 3 wherein said first and second slots are disposed at a 45° angle relative to each other.

5. An apparatus as set forth in claim 3 wherein said means for selectively adjusting the position of said second surface engaging member includes a support member slidable in said first slot and having said second surface engaging member mounted thereon, and means for selectively adjusting the position of said support member.

6. An apparatus as set forth in claim 5 wherein said means for maintaining location of said third surface engaging member on said circle includes, in said support member, a third slot intersecting said axis and said second slot, and wherein said third surface engaging member is also slidable in said third slot.

7. An apparatus as set forth in claim 6 wherein said first and second slots are disposed at a 45° angle relative to each other, and wherein said third slot is perpendicular to said second slot and is disposed at a 45° angle relative to said first slot.

8. An apparatus as set forth in claim 5 wherein said support member has therethrough an internally threaded bore, and wherein said means for selectively adjusting the position of said support member includes an externally threaded shaft threadedly received in said bore, and means for supporting said shaft on said base so that said shaft is fixed against axial movement relative to said base and is manually rotatable relative to said base.

9. An apparatus for gauging the diameter and concentricity of a bore in a workpiece, the bore having an inner surface, said apparatus comprising, a base including means defining first and second slots disposed at an acute angle relative to each other, a first surface engaging member supported by said base for movement relative to a reference point and along an axis, a second surface engaging member supported by said base for movement along said axis, said second surface engaging member being slidable in said first slot, a third surface engaging member movably supported by said base, said third surface engaging member being slidable in said second slot, said first, second and third surface engaging member being adapted to engage the inner surface of the bore, means for biasing said first surface engaging member against the inner surface of the bore, means for selectively adjusting the position of said second and third surface engaging members relative to said reference point, means for indicating the diameter of the circle defined by said second and third surface engaging members and said reference point, means for indicating movement of said first surface engaging member relative to said reference point to thereby indicate deviation of the diameter of the bore from said diameter when the workpiece is positioned with said surface engaging members engaging the inner surface of the bore, means for selectively adjusting the position of said second surface engaging member relative to said reference point, and means for moving said third surface engaging member in response to movement of said second surface engaging member to maintain location of said third surface engaging member on said circle.

10. An apparatus as set forth in claim 9 wherein said means for selectively adjusting the position of said second surface engaging member includes a support member slidable in said first slot and having said second surface engaging member mounted thereon, and means for selectively adjusting the position of said support member.

11. An apparatus as set forth in claim 10 wherein said means for maintaining location of said third surface engaging member on said circle includes, in said support member, a third slot intersecting said axis and said second slot, and wherein said third surface engaging member is also slidable in said third slot.

12. An apparatus as set forth in claim 10 wherein said support member has therethrough an internally threaded bore, and wherein said means for selectively adjusting the position of said support member includes an externally threaded shaft threadedly received in said bore, and means for supporting said shaft on said base so that said shaft is fixed against axial movement relative to said base and is manually rotatable relative to said base.

13. An apparatus as set forth in claim 9 wherein said means for indicating the diameter of said circle includes a member connected to said second surface engaging member, and means on said base for sensing the position of said member relative to said base.

14. An apparatus as set forth in claim 13 wherein said means for sensing the position of said member includes means for providing a visual display indicating the diameter of said circle.

15. An apparatus as set forth in claim 11 wherein said first and second slots are disposed at a 45° angle relative to each other.

16. An apparatus for gauging the diameter and concentricity of a bore, said apparatus comprising
a base plate having a generally planar surface, a first guide plate having first and second linear edges disposed at an acute angle relative to each other, a second guide plate having a linear edge, a third guide plate having a linear edge, said first, second, and third guide plates being mounted on said surface with said first edge of said first guide plate facing and spaced from said edge of said second guide plate to form a first slot having a width, and with said second edge of said first guide plate facing and spaced from said edge of said third guide plate to form a second slot having a width, a first support member slidably housed in said first slot and having thereon a first surface engaging member, a second support member slidably housed in said second slot and having thereon a second surface engaging member, and a cover plate mounted on said base plate so that said guide plates and said support members are positioned between said base plate and said cover plate, said cover plate having therethrough third and fourth slots respectively superimposed over said first and second slots so that said first surface engaging member extends through said third slot and said second surface engaging member extends through said fourth slot, said third slot having a width less than the width of said first slot and said fourth slot having a width less than the width of said second slot so that said first support member is slidably trapped between said cover plate and said base plate in said first slot and said second support member is slidably trapped between said cover plate and said base plate in said second slot.

17. An apparatus as set forth in claim 16 wherein said first surface engaging member and a reference point define the diameter of a circle, wherein said second surface engaging member is located on said circle, and wherein said apparatus further comprises means for selectively adjusting the position of said first surface engaging member relative to said reference point, means for moving said second surface engaging member in response to movement of said first surface engaging member to maintain location of said second surface engaging member on said circle, a third surface engaging member movable along an axis including said diameter, means for biasing said third surface engaging member away from said first surface engaging member, and means for indicating movement of said third surface engaging member relative to said reference point.

18. An apparatus as set forth in claim 17 and further comprising means for indicating the diameter of said circle.

19. An apparatus as set forth in claim 18 wherein said means for indicating the diameter of said circle includes a member connected to said first surface engaging member, and means on said base plate for sensing the position of said member relative to said base plate.

20. An apparatus as set forth in claim 19 wherein said means for sensing the position of said member includes means for providing a visual display indicating the diameter of said circle.

21. An apparatus as set forth in claim 17 wherein said first and second slots are disposed at a 45° angle relative to each other.

22. An apparatus as set forth in claim 17 wherein said means for selectively adjusting the position of said first surface engaging member includes means for selectively adjusting the position of said first support member.

23. An apparatus as set forth in claim 17 wherein said means for maintaining location of said second surface engaging member on said circle includes, in said first support member, a fifth slot intersecting said axis and said second slot, and wherein said second surface engaging member is also slidable in said fifth slot.

24. An apparatus as set forth in claim 23 wherein said first and second slots are disposed at a 45° angle relative to each other, and wherein said fifth slot is perpendicular to said second slot and is disposed at a 45° angle relative to said first slot.

25. An apparatus as set forth in claim 22 wherein said first support member has therethrough an internally threaded bore, and wherein said means for selectively adjusting the position of said first support member includes an externally threaded shaft threadedly received in said bore, and means for supporting said shaft on said base plate so that said shaft is fixed against axial movement relative to said base plate and is manually rotatably relative to said base plate.

26. An apparatus for gauging the diameter and concentricity of a bore in a workpiece, the bore having an inner surface, said apparatus comprising a base including means defining first and second slots disposed at an acute angle relative to each other, a first surface engaging member supported by said base for movement along an axis and relative to a reference point, a second surface engaging member supported by said base for movement along said axis, said second surface engaging member being slidable in said first slot, and said second surface engaging member and said reference point defining the diameter of a circle, a third surface engaging member movably supported by said base and located on said circle, said third surface engaging member being slidable in said second slot, said first, second, and third surface engaging member being adapted to be housed in the bore and to engage the inner surface of the bore, means for selectively adjusting the position of said second surface engaging member relative to said reference point, means for moving said third surface engaging member in response to movement of said second surface engaging member to maintain location of said third surface engaging member on said circle, means for biasing said first surface engaging member away from said second surface engaging member and against the inner surface of the bore, and means for indicating movement of said first surface engaging member from said reference point so that, when the workpiece is positioned with said surface engaging members engaging the inner surface of the bore, said indicating means indicates deviation of the diameter of the bore from said diameter and, when the workpiece is rotated about said surface engaging members, said indicating means gauges the concentricity of the bore.

27. An apparatus as set forth in claim 26 and further comprising means for indicating the diameter of said circle.

28. An apparatus as set forth in claim 27 wherein said means for indicating the diameter of said circle includes a member connected to said second surface engaging member, and means on said base for sensing the position of said member relative to said base.

29. An apparatus as set forth in claim 28 wherein said means for sensing the position of said member includes means for providing a visual display indicating the diameter of said circle.

30. An apparatus as set forth in claim 26 wherein said first and second slots are disposed at a 45° angle relative to each other.

31. An apparatus as set forth in claim 26 wherein said means for selectively adjusting the position of said second surface engaging member includes a support member slidable in said first slot and having said second surface engaging member mounted thereon, and means for selectively adjusting the position of said support member.

32. An apparatus as set forth in claim 31 wherein said means for maintaining location of said third surface engaging member on said circle includes, in said support member, a third slot intersecting said axis and said second slot, and wherein said third surface engaging member is also slidable in said third slot.

33. An apparatus as set forth in claim 32 wherein said first and second slots are disposed at a 45° angle relative to each other, and wherein said third slot is perpendicular to said second slot and is disposed at a 45° angle relative to said first slot.

34. An apparatus as set forth in claim 31 wherein said support member has therethrough an internally threaded bore, and wherein said means for selectively adjusting the position of said support member includes an externally threaded shaft threadedly received in said bore, and means for supporting said shaft on said base so that said shaft is fixed against axial movement relative to said base and is manually rotatable relative to said base.

35. An apparatus for gauging the diameter and concentricity of a bore in a workpiece, the bore having an inner surface, said apparatus comprising a base,
a first surface engaging member supported by said base for movement relative to a reference point,
a second surface engaging member movably supported by said base,
a third surface engaging member movably supported by said base,
said first, second and third surface engaging members being adapted to engage the inner surface of the bore,
means for biasing said first surface engaging member against the inner surface of the bore,
means for selectively adjusting the position of said second and third surface engaging members relative to said reference point,
means for indicating the diameter of the circle defined by said second and third surface engaging members and said reference point, said means for indicating the diameter of said circle including a member connected to said second surface engaging member, and means on said base for sensing the position of said member relative to said base, and
means for indicating movement of said first surface engaging member relative to said reference point to thereby indicate deviation of the diameter of the bore from said diameter when the workpiece is positioned with said surface engaging members engaging the inner surface of the bore.

36. An apparatus as set forth in claim 35 wherein said first and second surface engaging members are movable along an axis, wherein said apparatus further comprises means for selectively adjusting the position of said second surface engaging member relative to said reference point, and means for moving said third surface engaging member in response to movement of said second surface engaging member to maintain location of said third surface engaging member on said circle, wherein said base includes means defining first and second slots disposed at an acute angle relative to each other, wherein said second surface engaging member is slidable in said first slot, and wherein said third surface engaging member is slidable in said second slot.

37. An apparatus as set forth in claim 36 wherein said means for selectively adjusting the position of said second surface engaging member includes a support member slidable in said first slot and having said second surface engaging member mounted thereon, and means for selectively adjusting the position of said support member.

38. An apparatus as set forth in claim 37 wherein said means for maintaining location of said third surface engaging member on said circle includes, in said support member, a third slot intersecting said axis and said second slot, and wherein said third surface engaging member is also slidable in said third slot.

39. An apparatus as set forth in claim 37 wherein said support member has therethrough an internally threaded bore, and wherein said means for selectively adjusting the position of said support member includes an externally threaded shaft threadedly received in said bore, and means for supporting said shaft on said base so that said shaft is fixed against axial movement relative to said base and is manually rotatable relative to said base.

40. An apparatus as set forth in claim 35 wherein said means for sensing the position of said member includes means for providing a visual display indicating the diameter of said circle.

41. An apparatus as set forth in claim 36 wherein said first and second slots are disposed at a 45° angle relative to each other.

* * * * *